US012704167B2

(12) United States Patent
Shao et al.

(10) Patent No.: US 12,704,167 B2
(45) Date of Patent: Aug. 11, 2026

(54) ANTI-MOMENT MACHINE AND MOMENT RESISTING DEVICE THEREOF

(71) Applicant: DELTA ELECTRONICS, INC., Taoyuan City (TW)

(72) Inventors: Chi-Huan Shao, Taoyuan City (TW); Cheng-Hao Huang, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 126 days.

(21) Appl. No.: 18/782,026

(22) Filed: Jul. 24, 2024

(65) Prior Publication Data

US 2025/0377033 A1 Dec. 11, 2025

(30) Foreign Application Priority Data

Jun. 6, 2024 (CN) ......................... 202410729006.6

(51) Int. Cl.
*F16F 15/02* (2006.01)
*B23Q 11/00* (2006.01)

(52) U.S. Cl.
CPC .......... *F16F 15/02* (2013.01); *B23Q 11/0032* (2013.01); *F16F 2230/0035* (2013.01); *F16F 2230/0041* (2013.01); *F16F 2232/02* (2013.01)

(58) Field of Classification Search
CPC .. F16F 15/02; F16F 15/022; F16F 2230/0035; B23Q 11/0032
USPC ......................................... 248/615, 673, 677
See application file for complete search history.

(56) References Cited

U.S. PATENT DOCUMENTS

| | | | | |
|---|---|---|---|---|
| 4,596,373 A * | 6/1986 | Omi | G21C 9/04 | 248/588 |
| 5,178,357 A * | 1/1993 | Platus | F16F 3/026 | 248/619 |
| 5,374,012 A * | 12/1994 | Marchand | B64D 47/08 | 248/608 |
| 7,182,506 B2 * | 2/2007 | Schulz | B01F 29/10 | 366/217 |
| 9,534,656 B2 * | 1/2017 | Xu | F16F 15/02 | |
| 10,167,652 B2 * | 1/2019 | Nakakubo | F16F 15/067 | |

(Continued)

FOREIGN PATENT DOCUMENTS

| | | |
|---|---|---|
| CN | 113369976 A | 9/2021 |
| CN | 114310003 A | 4/2022 |

(Continued)

*Primary Examiner* — Bradley Duckworth
(74) *Attorney, Agent, or Firm* — HDLS IPR SERVICES; Chun-Ming Shih

(57) ABSTRACT

This disclosure is directed to an anti-moment machine and a moment resisting device thereof, device. The anti-moment machine has a machine body and at least one pair of moment resisting device. The moment resisting devices are respectively arranged on two sides of the machine body oppositely. Each moment resisting device has a base, a bracket, an elastic arm and a damper. The elastic arm is respectively connected to one side of the base and a bottom of the bracket, and an obtuse angle is defined between the base and the bracket. The damper is connected between the base and the bracket. The machine body is applied preload moments and preload lateral forces from the moment resisting device respectively to balance the moment in the machine body and reduce vibrations of the machine body.

15 Claims, 11 Drawing Sheets

(56) References Cited

U.S. PATENT DOCUMENTS

| | | | | | |
|---|---|---|---|---|---|
| 10,539,204 | B2 * | 1/2020 | Arias-Acosta | ...... | F16F 15/0235 |
| 10,718,399 | B2 * | 7/2020 | Martin | .................. | F16F 15/067 |
| 11,976,702 | B2 * | 5/2024 | De Santis | ............. | F16F 15/023 |
| 12,203,524 | B2 * | 1/2025 | Wachter | ................ | F16F 15/022 |
| 12,215,752 | B1 * | 2/2025 | Steg | ......................... | B64G 1/66 |
| 2019/0145482 | A1 * | 5/2019 | Nakazato | .................. | F16F 7/01<br>267/195 |
| 2023/0095802 | A1 * | 3/2023 | Hwang | ................ | F16M 11/046<br>248/543 |
| 2025/0180094 | A1 * | 6/2025 | Lasker | ................. | F16M 11/043 |

FOREIGN PATENT DOCUMENTS

| | | |
|---|---|---|
| CN | 218461555 U | 2/2023 |
| CN | 219900552 U | 10/2023 |

* cited by examiner

ANTI-MOMENT MACHINE AND MOMENT RESISTING DEVICE THEREOF

BACKGROUND OF THE INVENTION

Technical Field

This disclosure is directed to a structure for stabilizing an equipment machine, in particular to an anti-moment machine and moment resisting device thereof.

Description of Related Art

A related art equipment machine is supported by feet, and each foot has combination rubber parts and metal parts. The metal parts are used as structures for supporting, and the rubber parts are used for absorbing shock and adapting an uneven floor. The feet abut on the floor with insufficient restriction between the feet and the floor, and a weight of the equipment may cause additional force for restricting the equipment machine in general. Moreover, the feet have poor ability to resist forces along lateral directions and the feet are therefore unable to overcome shakes caused by machine operation.

In views of this, in order to solve the above disadvantage, the inventor studied related technology and provided a reasonable and effective solution in this disclosure.

SUMMARY OF THE INVENTION

A purpose of this disclosure is effectively positioning a movement range of an assembly to avoid skew, and preventing the button assembly from getting stuck or trigger failure cause by skew or slipping off.

This disclosure is directed to an anti-moment machine and a moment resisting device thereof.

This disclosure is directed to a moment resisting device having a base, a bracket, an elastic arm, and a damper. The elastic arm is connected to one side of the base and a bottom of the bracket, a predetermined angle is defined between the base and the bracket. The damper is connected between the base and the bracket.

In one embodiment, the damper is obliquely arranged relative to both of the base and the bracket.

In one embodiment, the damper has two ends pivoted to the base and the bracket, respectively.

In one embodiment, the elastic arm is a bent metal plate.

In one embodiment, the elastic arm is assembled with a side edge of the base and a side edge of the bracket respectively.

In one embodiment, a slip-proof pad is arranged under the base, and the damper is disposed over the base.

In one embodiment, the bracket is disposed above the base.

In one embodiment, the slip-proof pad has a convex arc surface, and the base has a concave arc surface matching the convex arc surface.

This disclosure is directed to an anti-moment machine having a machine body and at least one pair of moment resisting devices. The moment resisting devices are arranged opposite to each other at two sides of the machine body, and each of the moment resisting devices has a base, a bracket, an elastic arm, and a damper. The elastic arm is applied a preload force and respectively connected to one side of the base and a bottom of the bracket, and the damper is connected between the base and the bracket.

In one embodiment, the damper is obliquely arranged relative to both of the base and the bracket.

In one embodiment, the damper has two ends pivoted to the base and the bracket, respectively.

In one embodiment, the elastic arm is a bent metal plate.

In one embodiment, the elastic arm is assembled with a side edge of the base and a side edge of the bracket respectively.

In one embodiment, a slip-proof pad is arranged under the base, and the damper is disposed over the base.

In one embodiment, the bracket is disposed above the base.

In one embodiment, the slip-proof pad has a convex curved surface, and the base has a concave curved surface coupled with the convex curved surface.

In one embodiment, a contact screw is respectively provided on the machine body corresponding to each moment resisting device, and the contact screw abuts a top of the bracket of the corresponding moment resisting device along the longitudinal direction of the contact screw.

The moment resisting device according to this disclosure can be applied a preload moment and a preload lateral force on the machine body so as to balance external torsions to the machine body, thereby alleviating vibrations of the machine body. The elastic arm is configured with a deformation to cause a preload normal force to the base, so as to provide additional frictions between the slip-proof pad and a floor. The additional frictions additionally support the machine body at a lateral direction.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

Figure 1:
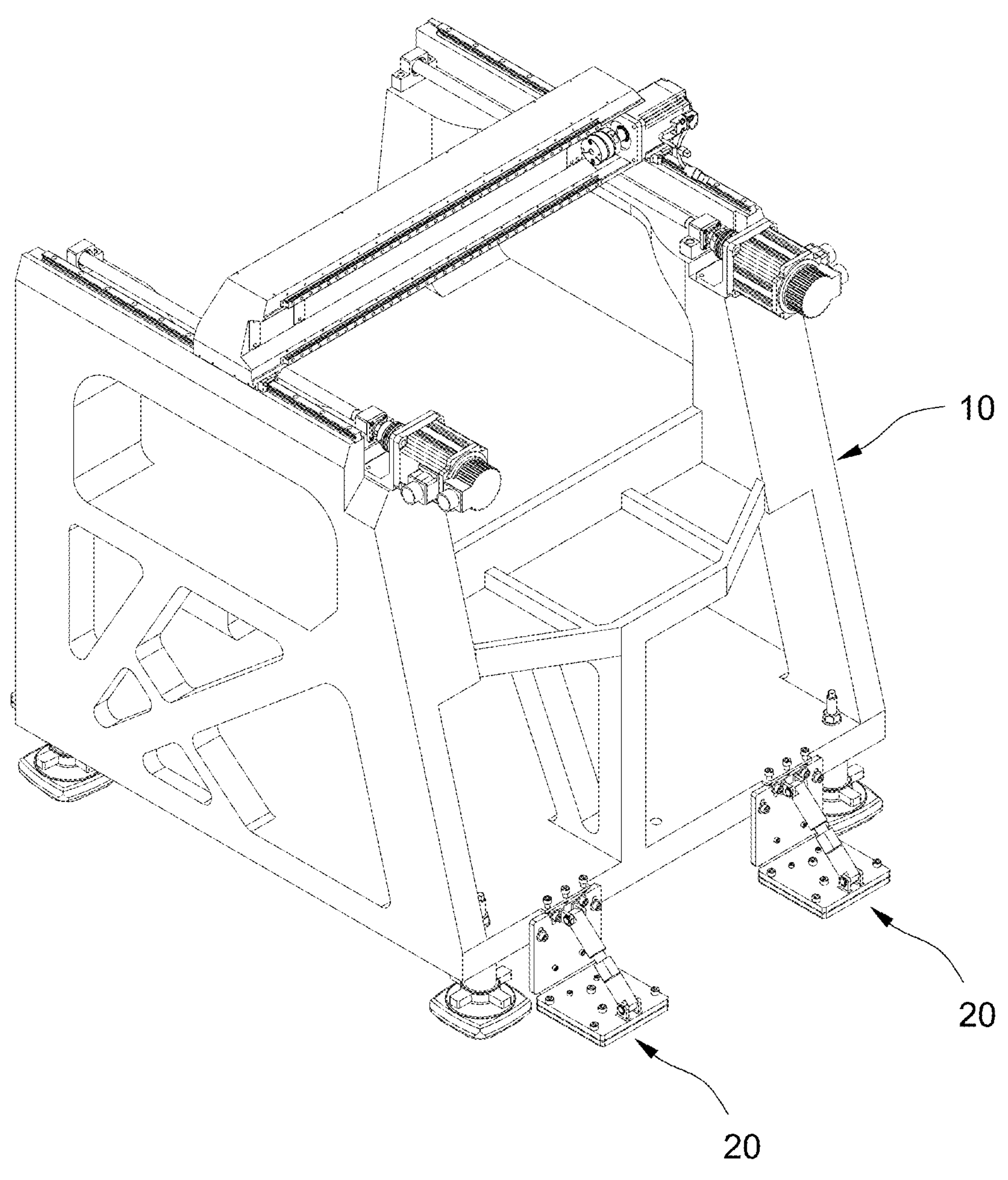
FIG. 1 is a perspective view showing an anti-moment machine according to an embodiment of this disclosure.

The technical contents of this disclosure will become apparent with the detailed description of embodiments accompanied with the illustration of related drawings as follows. It is intended that the embodiments and drawings disclosed herein are to be considered illustrative rather than restrictive.

It should be understood that the orientations or positional relationships in this disclosure which are indicated by the terms such as "front side", "rear side", "left side", "right side", "front end", "rear end", "end", "vertical", "horizontal", "vertical", "top" and "bottom" are based on the orientations or positional relationships as shown in the drawings. These are only used for describing this disclosure and simplifying the description rather than indicating or implying that the device or element have a specific orientation or be constructed and operated in a specific orientation, and it should not be considered as limitations of the scopes of this disclosure.

The terms used herein without additional definition such as "substantially" and "approximately" are used to describe and illustrate small changes. When used in an event or situation, the term may include the precise moment at which the event or situation occurs, and a close approximation to moment the event or situation occurs. For example, when combined with a numerical value, the term may include a range of variation less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to =0.1%, or less than or equal to ±0.05%.

Detailed descriptions and technical contents of this disclosure is described in the flowing paragraph with reference to the drawings. However, the drawings are attached only for illustration and are not intended to limit this disclosure.

Figure 2:
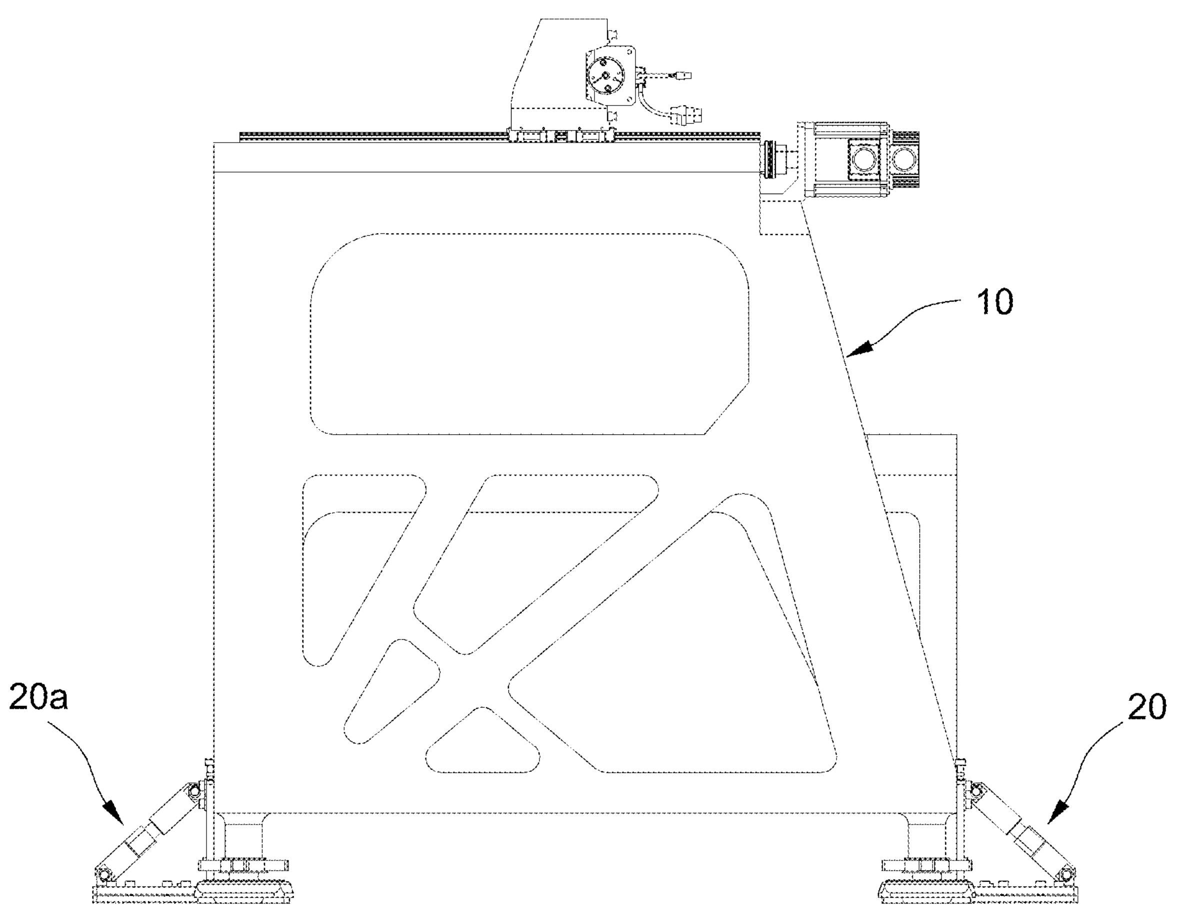
FIG. 2 is a side view showing the anti-moment machine according to the embodiment of this disclosure.

According to one embodiment of this disclosure as shown in FIGS. 1 to 2, an anti-moment machine has a machine body 10 and at least one pair of moment resisting devices 20, 20*a*. In this embodiment, the anti-moment machine has two pairs of moment resisting devices 20, 20*a*, but the number of pairs is not limited in this disclosure. The pairs of moment resisting devices 20, 20*a* have configurations the same as each other, and only one pair of the moment resisting devices 20, 20*a* will be described later as an example to explain the configuration of each of the moment resisting devices 20, 20*a*.

Figure 3:
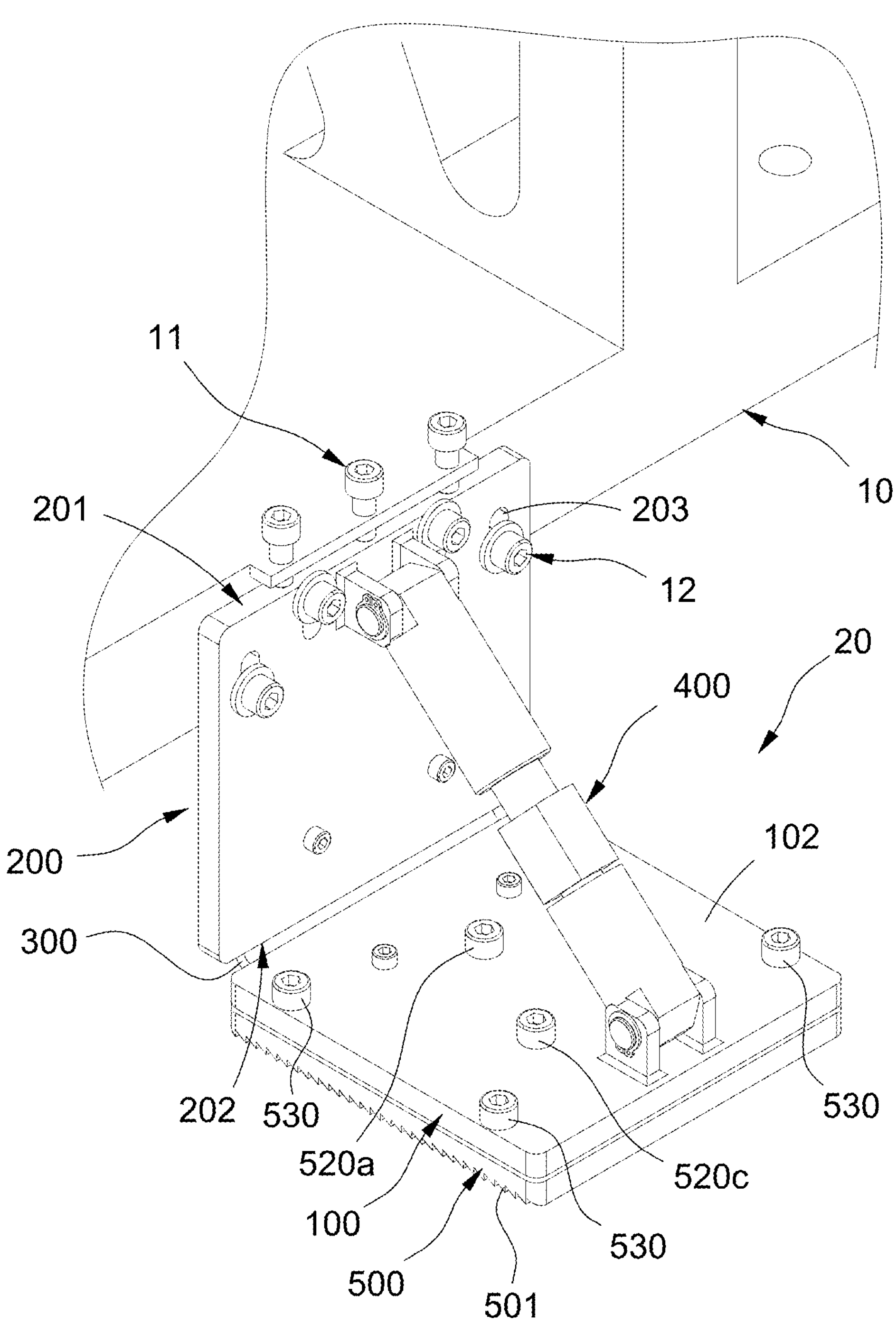
FIG. 3 is a perspective view showing a moment resisting device according to the embodiment of this disclosure.
Figure 4:
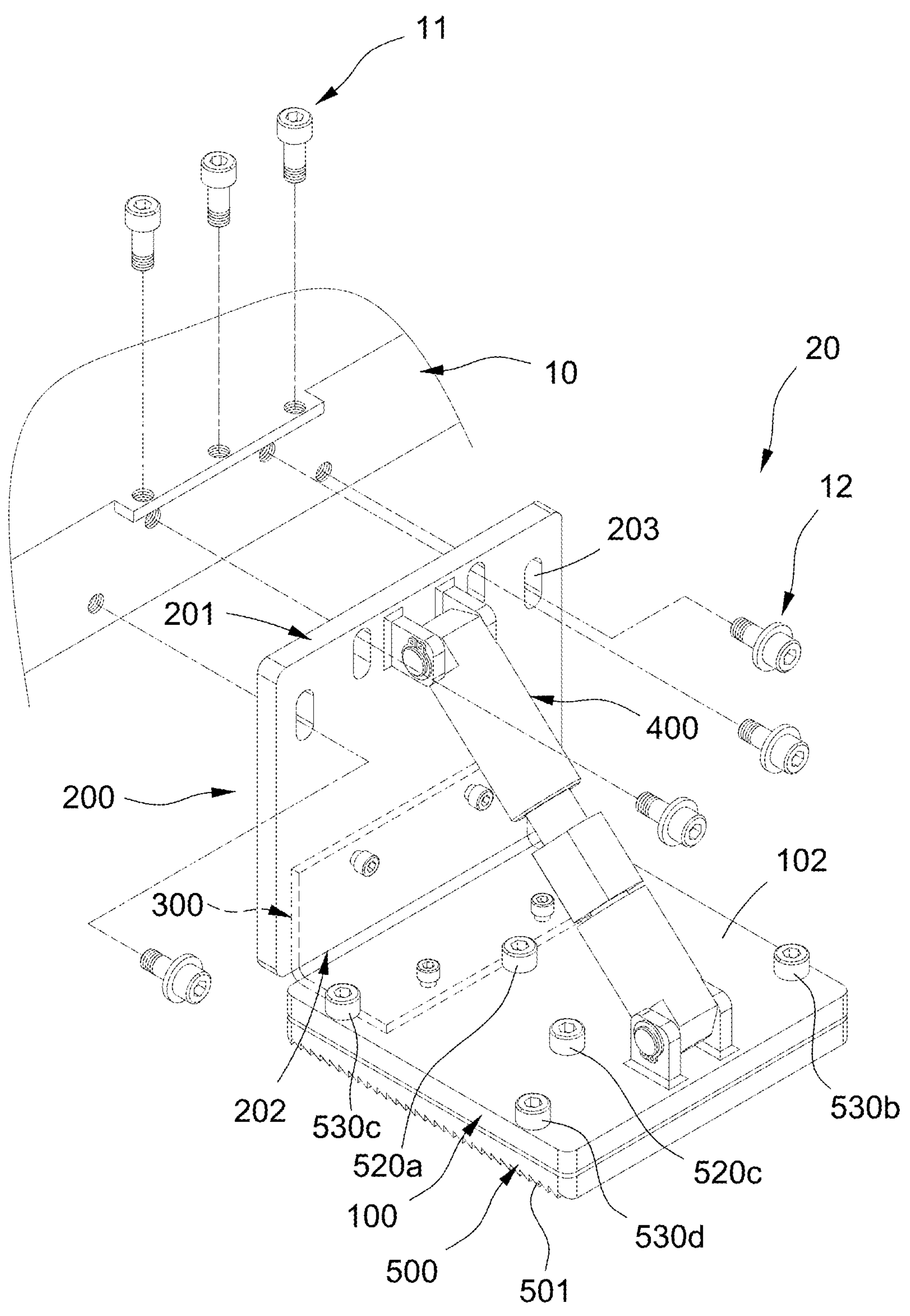
FIGS. 4 and 5 are exploded views of the moment resisting device according to the embodiment of this disclosure.

According to FIGS. 3 to 4, at least a contact screw 11 is arranged on the machine body 10 and corresponding to each of the moment resisting device 20, 20*a*, where the contact screw is up-right arranged.

According to FIG. 2, the moment resisting devices 20, 20*a* in each pair are respectively arranged opposite to each other on two sides of the machine body 10. The moment resisting devices 20, 20*a* have structures the same as each other, and only one of the moment resisting devices 20 will be described later as an example to explain the structure of each of the moment resisting devices 20, 20*a*.

According to FIGS. 3 to 6, each moment resisting device 20 has a base 100, a bracket 200, an elastic arm 300, and a damper 400.

According to this embodiment, the base 100 is a plate having a bottom surface 101 and a top surface 102 opposite to the bottom surface 101. When the moment resisting device 20 is installed on the machine body 10, the base 100 is horizontally configured to abut against a floor via the bottom surface 101, but scopes of this disclosure should not be limited to this.

According to this embodiment, the bracket 200 is a plate, and the bracket 200 is up-right arranged when the moment resisting device 20 is installed on the machine body 10. Therefore, a top portion 201 and a bottom portion 202 are defined on the bracket 200. The top portion 201 contains a top edge of the bracket 200 and adjacent portions under the top edge, the bottom portion 202 contains a bottom edge of the bracket 200 and adjacent portions over the bottom edge.

Figure 5:
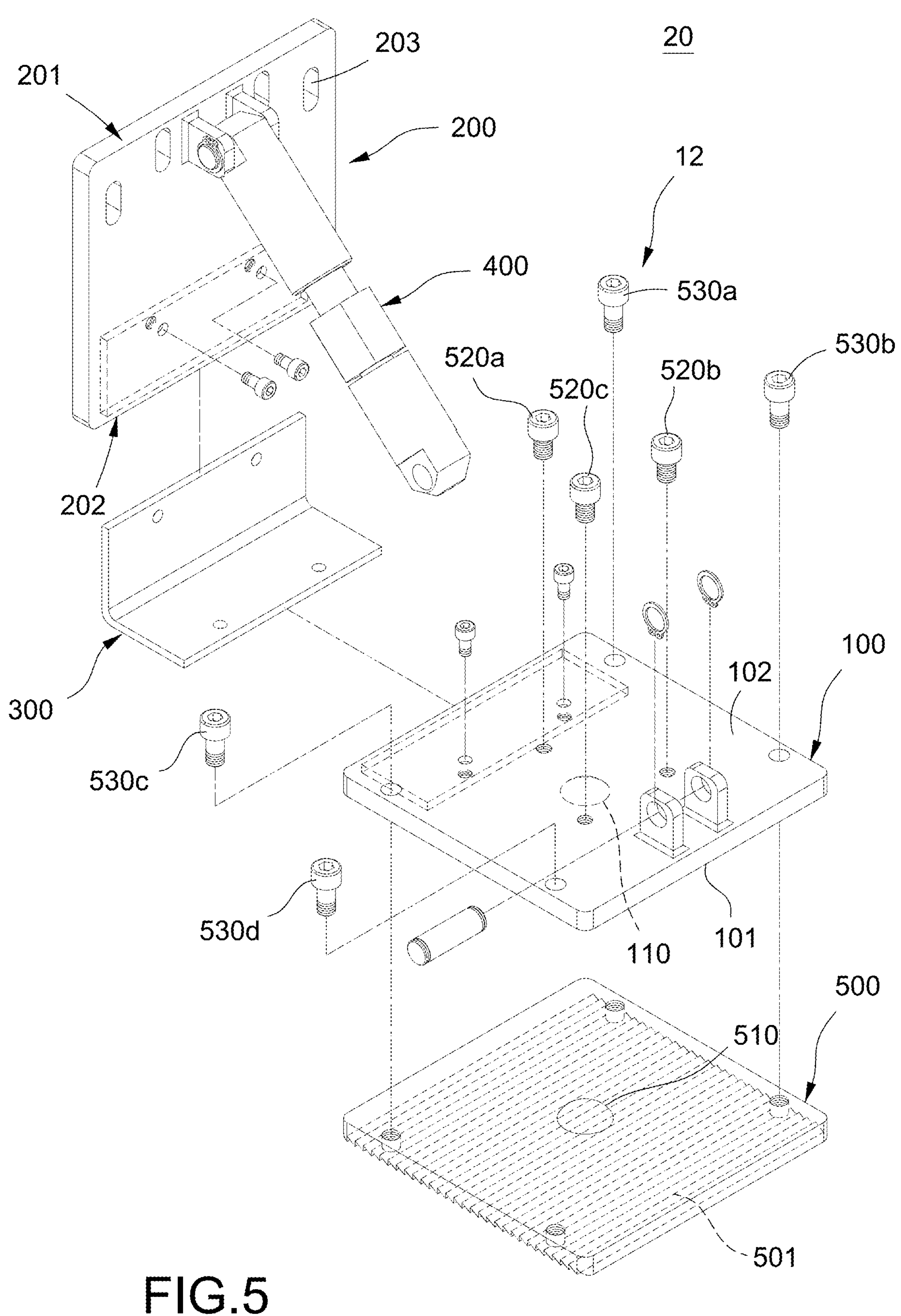
Figure 6:
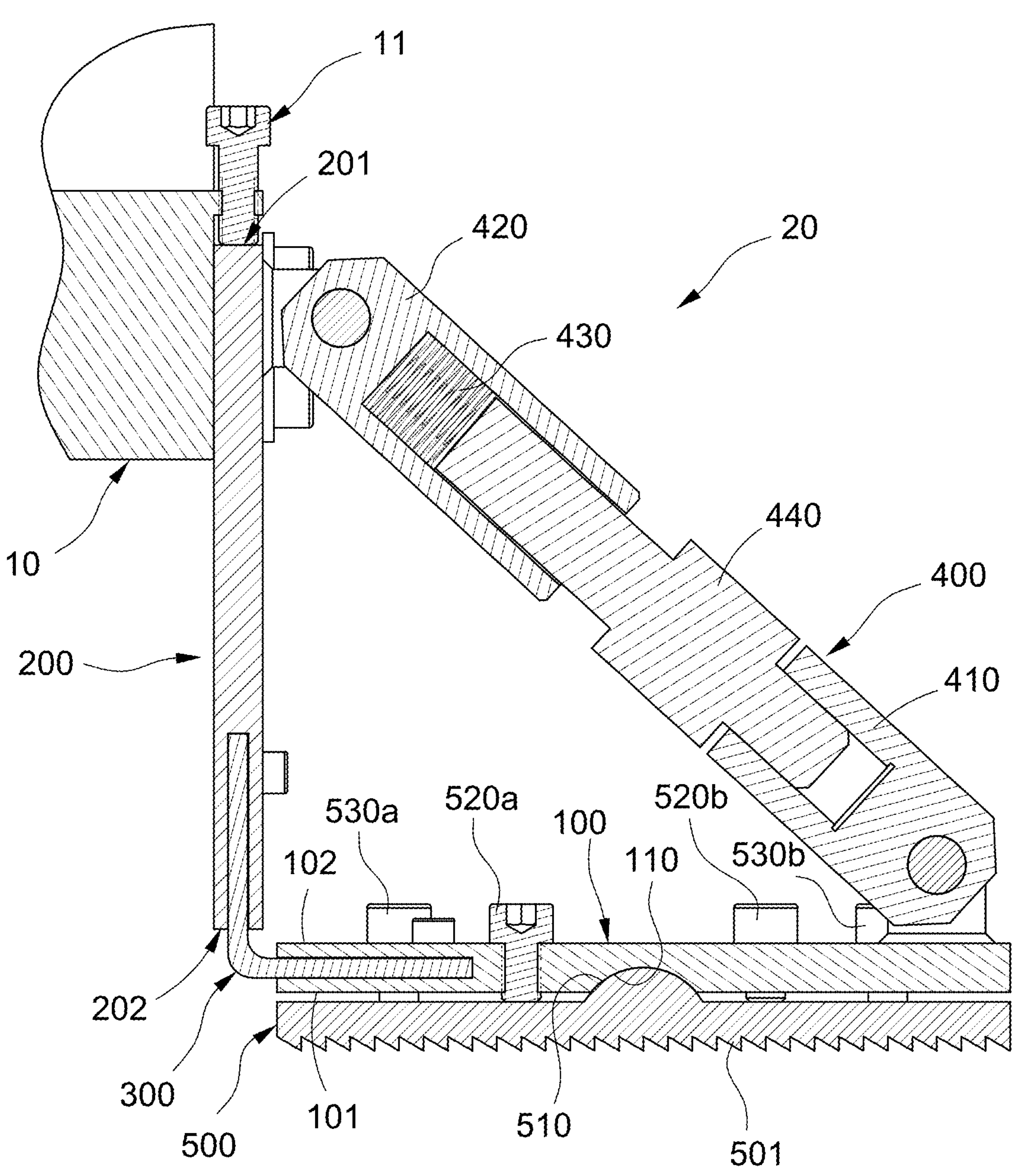
FIG. 6 is a cross-sectional view of the moment resisting device according to the embodiment of this disclosure.

According to this embodiment as shown in FIGS. 5 to 6, the elastic arm 300 is a curved metal plate having two ends respectively connected to one side of the edge of the base 100 and to the bottom portion 202 of the bracket 200, thereby making the bracket 200 to stand on one side of the base 100. The elastic arm 300 has two ends respectively assembled on a side edge of the base 100 and a side edge at the bottom portion 202 of the bracket 200. The elastic arm 300 can be configured with various elastic coefficients corresponding to torsional resistance requirements of various machine bodies 10. Additionally, the elastic arm 300 withstands most of external forces applied to the moment resisting device 20 and thereof is more prone to damage compared with other components of the moment resisting device 20. Thus, the elastic arm 300 may be configured as a detachable part to reduce maintenance costs.

Figure 7:
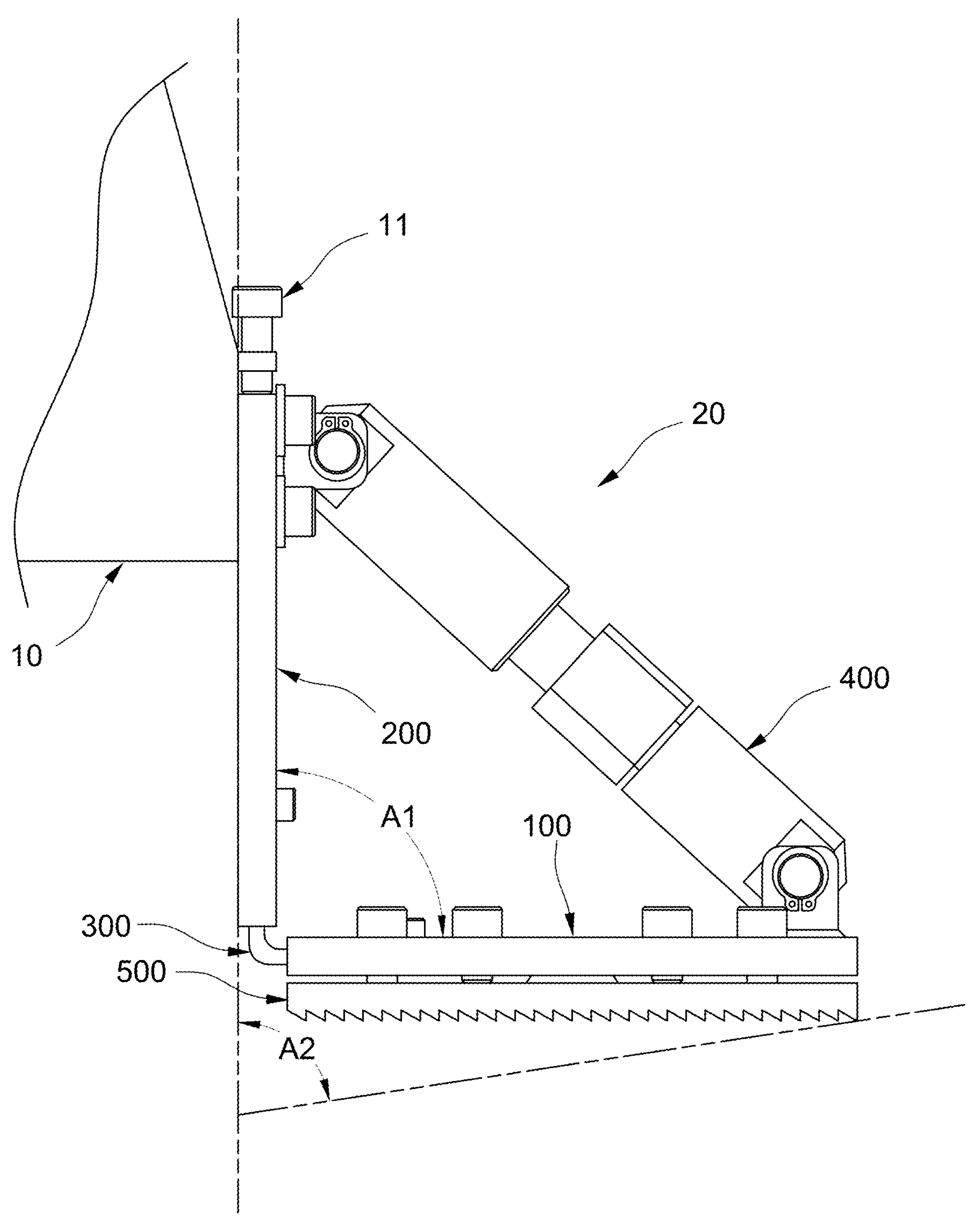
FIGS. 7 and 8 are schematic views showing an initial state of the moment resisting device according to the embodiment of this disclosure.
Figure 8:
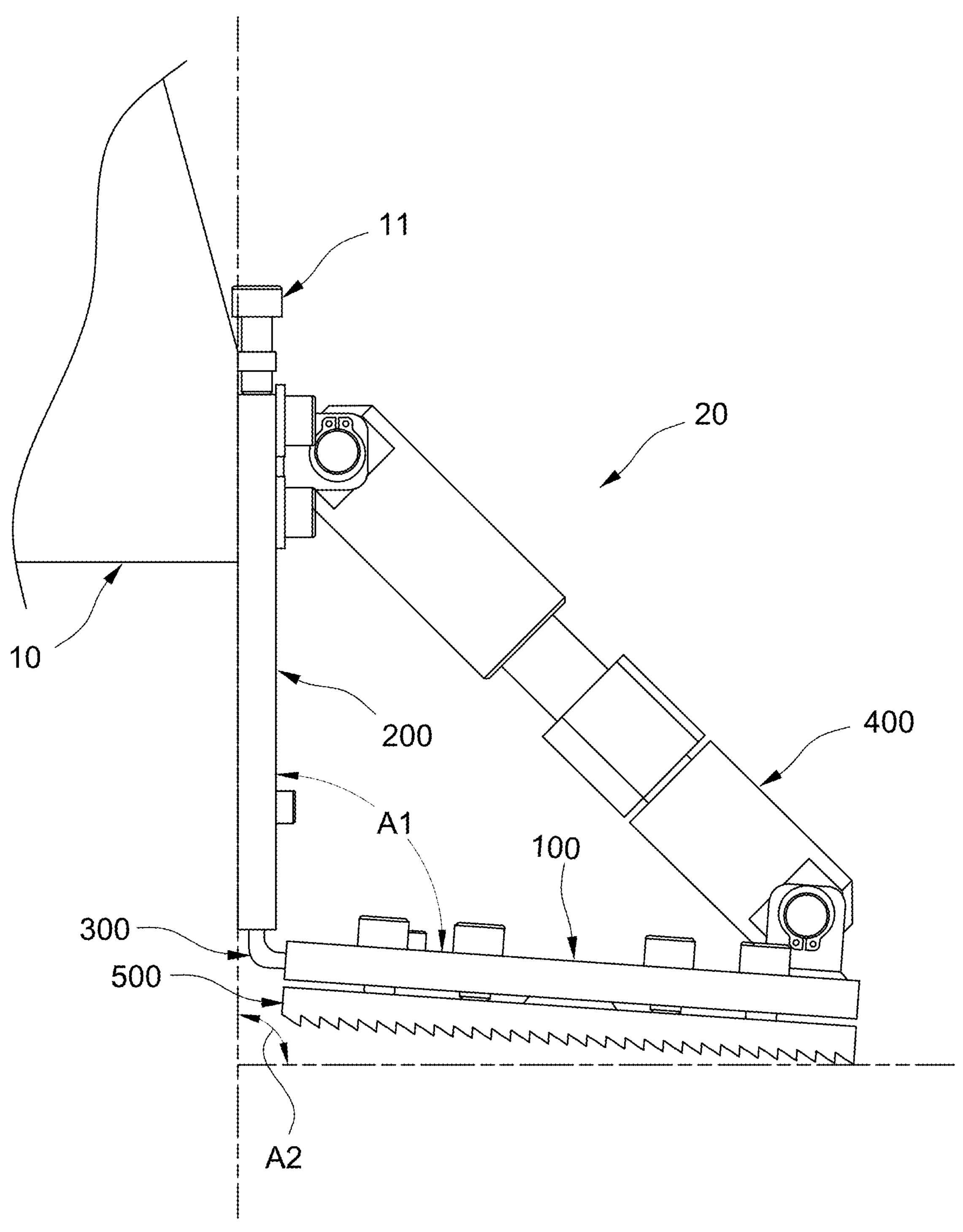
Figure 9:
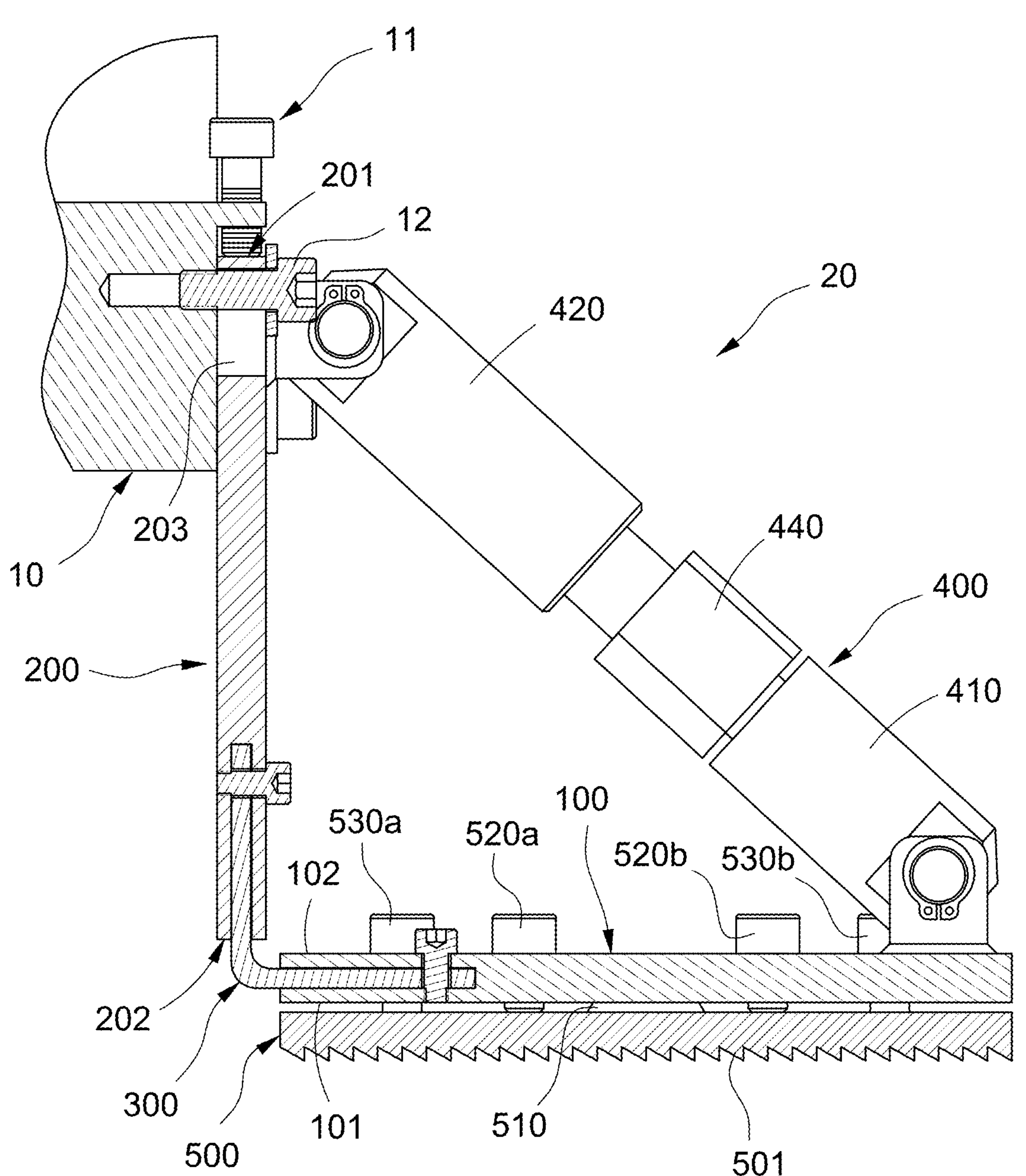
FIGS. 9 and 10 are schematic views showing an operation state of the moment resisting device according to the embodiment of this disclosure.
Figure 10:
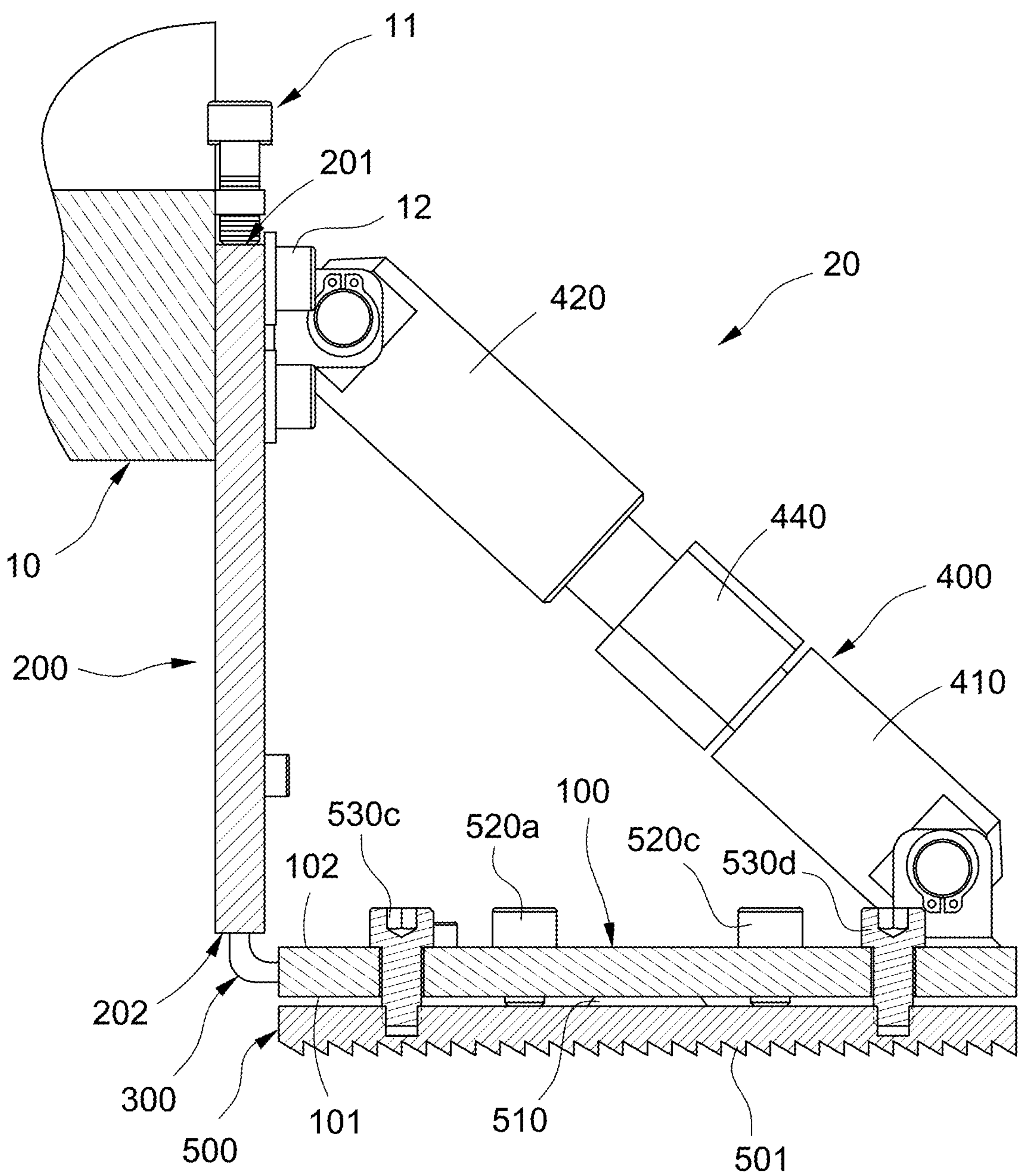

According to FIG. 7, when the moment resisting device 20 is in an initial state and not installed on the machine body 10 yet, a predetermined angle A1 is defined between the base 100 and the bracket 200. The predetermined angle A1 is configured according to a surface angle A2 defined between the floor where the moment resisting device 20 is installed and a side of the machine body 10 where the moment resisting device 20 is mounted. The predetermined angle A1 should be greater than the surface angle A2 between the machine body 10 and the floor to allow the elastic arm 300 to be applied with a preload force until the angle between the base 100 and the bracket 200 is compressed to equal to the surface angle A2. Generally, the side of the machine body 10 is perpendicular to the floor, namely the surface angle A2 is 90 degrees, so that the predetermined angle A1 is configured as an obtuse angle. Specifically, the obtuse angle is slightly larger than a right angle. As shown in FIG. 8, the predetermined angle A1 may also be configured as a right angle or an acute angle to match various surface angles A2. According to FIGS. 9 and 10, when the moment resisting device 20 is installed on the machine body 10, the contact screw 11 correspondingly abuts against the top portion 201 of the bracket 200 of the moment resisting device 20 along its longitudinal direction, thereby disposing the preload force on the elastic arm 300. The elastic arm 300 is elastically deformed by the preload force to adjust the base 100 and the bracket 200 to be a working status having a right angle between the base 100 and the bracket 200. Additionally, the fastening screw 12 is moveable relative to the sliding slot 203 when it is not fastened yet, so that the bracket 200 can be pushed to move by the contact screw 11 to push.

According to FIG. 6, the damper 400 is connected between the base 100 and the bracket 200, and the damper 400 is arranged obliquely relative to the base 100 and the bracket 200, respectively. Specifically, the damper 400 has two ends respectively pivoted to the top surface 102 of the base 100 and one side of the bracket 200. According to this embodiment, the damper 400 has a first end piece 410, a second end piece 420, an elastic element 430, and a threaded piece 440. The first end piece 410 is pivoted to the bracket 200, the second end piece 420 is pivoted to the base 100, the threaded piece 440 is screwed into the second end piece 420, and the elastic element 430 is applied with a preload force and connected between the first end piece 410 and the threaded piece 440. An elastic force is generated by the elastic arm 300 and can be trimmed via buffering a moment on the elastic arm 300 by another elastic force caused by the elastic element 430 with the preload force. A user may modify an overall length of the threaded piece 440 and the second end piece 420 by twisting the threaded piece 440, thereby modifying a predetermined length of the elastic element 430 to correspondingly adjust an elastic force caused by the elastic element 430.

According to FIG. 6, the elastic arm 300 is applied with the preload force and elastically deformed so as to generate a moment, and the moment applies a lateral force on the machine body 10. According to FIGS. 2 and 6, the pairs of the moment resisting devices 20, 20*a* at the two sides of the machine respectively apply collinear forces opposite to each other on the machine body 10. When the machine body 10 is shacked during an operation, the machine body 10 applies moments to the moment resisting devices 20, 20*a* on both sides, and each of the moment resisting devices 20, 20*a* generates a moment through the elastic arm 300 with the preload force to eliminate the moment from the machine body 10. Accordingly, the shaking of the machine is alleviated.

According to FIGS. 4 to 6, a slip-proof pad 500 is provided on the bottom surface 101 of the base 100, the damper 400 is arranged on the top surface 102 of the base 100, and the bracket 200 is disposed above the top surface 102 of the base 100. A resistance surface 501 for attaching to the floor is disposed on one surface of the slip-proof pad 500, and the resistance surface 501 may be rough surface or disposed with a barb structure for providing friction. The slip-proof pad 500 has a convex arc surface 510 disposed on the other surface thereof opposite to the resistance surface 501. A concave arc surface 110 relative to the convex arc surface 510 is defined on the bottom surface 101 of the base 100 mentioned above, so that the concave arc surface 110 can be engaged with the convex arc surface 510. The concave arc surface 110 and the convex arc surface 510 are configured to cooperate with each other, so that the base 100 and the slip-proof pad 500 are allowed to rotate relative to each other about a curvature center of the convex arc surface 510. Therefore, the resistance surface 501 can be adjusted to attach on the floor so that the moment resisting device 20 is fixed to the floor and prevented from slipping. According to this embodiment, the slip-proof pad 500 is loosely connected to the base 100 by at least one pre-assembled screw 530*a*, 530*b*, 530*c*, 530*d*, so that the base 100 and the slip-proof pad 500 are allowed to move relative to each other. A plurality positioning screws 520*a*, 520*b*, 520*c* are screwed to the base 100 to penetrate the base 100. When the bracket 200 and the base 100 are not adjusted to the working status yet, the positioning screws 520*a*, 520*b*, 520*c* are loose relative to the slip-proof pad 500. When the slip-proof pad 500 and the base 100 are relatively adjusted to the working status, the positioning screws 520*a*, 520*b*, 520*c* are twisted to move longitudinally to abut against the slip-proof pad 500, so as to fix the slip-proof pad 500 at a specific position relative to the base 100.

Figure 11:
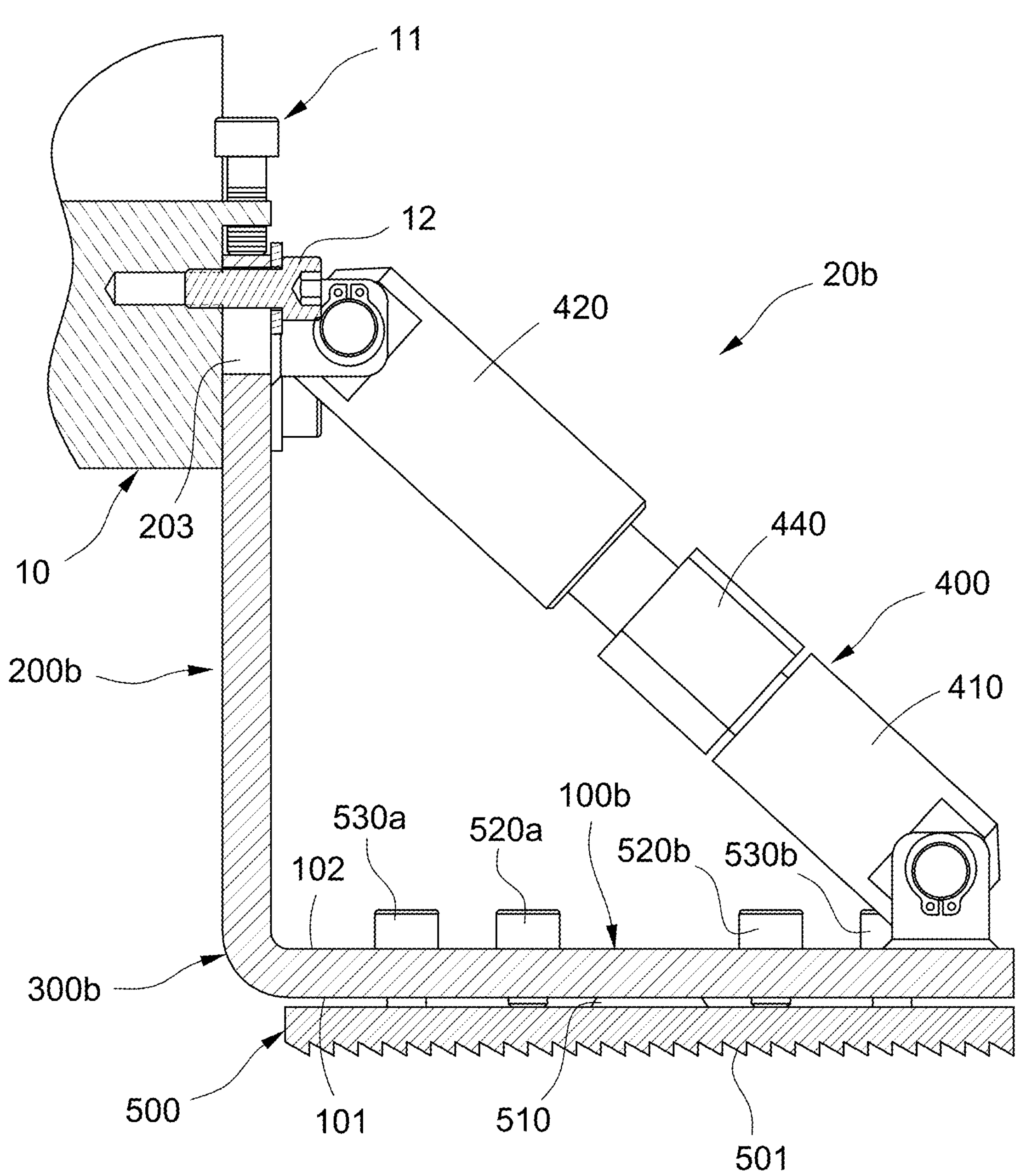
FIG. 11 is a cross-sectional view showing a moment resisting device according to another embodiment of this disclosure.

According another embodiment of this disclosure as shown in FIG. 11, a moment resisting device 20*b* of this embodiment has a base 100*b*, a bracket 200*b*, an elastic arm 300*b*, and a damper 400. The base 100*b*, the bracket 200*b*, the elastic arm 300*b*, and the damper 400 are substantially the same as those in the embodiment previously mentioned. This embodiment is different from the first embodiment aforementioned in that the elastic arm 300*b*, the base 100*b*, and the bracket 200*b* are integrally formed as one piece. A metal plate is punched and then bent to form the base 100*b*, the bracket 200*b*, and the elastic arm 300*b* are formed on a single metal plate by punching and bent, so that this embodiment is easy for manufacturing.

The moment resisting devices 20, 20*a*, 20*b* disclosed herein can be applied with a preload torque and a preload lateral force on the machine body 10 to balance the torsional force on the machine body 10, thereby reducing the vibration of the machine body 10. Thus, the machine body 10 does not need to be bolted to the floor. The moment resisting device 20 loads torque on the machine body 10 through the pre-compression deformation of the elastic arm 300 and the elastic force provided by the damper 400. The pre-compression deformation of the elastic arm 300 provides a positive force to the base 100, increasing the friction between the slip-proof pad 500 and the floor. The increased friction provides additional lateral support to the machine body 10.

While this disclosure has been described by means of specific embodiments, numerous modifications and variations could be made thereto by those skilled in the art without departing from the scope and spirit of this disclosure set forth in the claims.

What is claimed is:

1. A moment resisting device comprising:

a base;

a slip-proof pad arranged under the base, wherein the slip-proof pad comprises a convex curved surface, and the base comprises a concave curved surface coupled with the convex curved surface;

a bracket;

an elastic arm, connected to one side of the base and a bottom of the bracket, a predetermined angle being defined between the base and the bracket; and a damper, connected between the base and the bracket.

2. The moment resisting device according to claim 1, wherein the damper is obliquely arranged relative to both of the base and the bracket.

3. The moment resisting device according to claim 1, wherein the damper comprises two ends pivoted to the base and the bracket, respectively.

4. The moment resisting device according to claim 1, wherein the elastic arm is a bent metal plate.

5. The moment resisting device according to claim 1, wherein the elastic arm is assembled with a side edge of the base and a side edge of the bracket respectively.

6. The moment resisting device according to claim 1, wherein the damper is disposed over the base.

7. The moment resisting device according to claim 1, wherein the bracket is disposed above the base.

8. An anti-moment machine, comprising:

a machine body; and at least one pair of moment resisting devices, arranged opposite to each other on two sides of the machine body, each of the moment resisting devices comprising a base, a slip-proof pad arranged under the base, a bracket, an elastic arm, and a damper, wherein the elastic arm is applied with a preload force and respectively connected to one side of the base and a bottom of the bracket, the damper is connected between the base and the bracket, the slip-proof pad comprises a convex curved surface, and the base comprises a concave curved surface coupled with the convex curved surface.

9. The anti-moment machine according to claim 8, wherein the damper is obliquely arranged relative to both of the base and the bracket.

10. The anti-moment machine according to claim 8, wherein the damper comprises two ends pivoted to the base and the bracket, respectively.

11. The anti-moment machine as claimed in claim 8, wherein the elastic arm is a bent metal plate.

12. The anti-moment machine according to claim 8, wherein the elastic arm is assembled with a side edge of the base and a side edge of the bracket respectively.

13. The anti-moment machine according to claim 8, wherein the damper is disposed over the base.

14. The anti-moment machine according to claim 8, wherein the bracket is disposed above the base.

15. The anti-moment machine according to claim 8, wherein a contact screw is respectively provided on the machine body corresponding to each moment resisting device, and the contact screw is configured to abut a top of the bracket of the corresponding moment resisting device along the longitudinal direction of the contact screw.

* * * * *